US012774390B2

(12) United States Patent
Saito et al.

(10) Patent No.: US 12,774,390 B2
(45) Date of Patent: Oct. 27, 2026

(54) ALUMINUM PIGMENT, METHOD FOR PRODUCING ALUMINUM PIGMENT, COATING MATERIAL COMPOSITION CONTAINING ALUMINUM PIGMENT, AND INK COMPOSITION

(71) Applicant: ASAHI KASEI KABUSHIKI KAISHA, Tokyo (JP)

(72) Inventors: Masaki Saito, Tokyo (JP); Atsutoshi Sugimoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 318 days.

(21) Appl. No.: 18/579,989

(22) PCT Filed: Sep. 5, 2022

(86) PCT No.: PCT/JP2022/033291

§ 371 (c)(1),
(2) Date: Jan. 17, 2024

(87) PCT Pub. No.: WO2023/038009

PCT Pub. Date: Mar. 16, 2023

(65) Prior Publication Data

US 2024/0327645 A1 Oct. 3, 2024

(30) Foreign Application Priority Data

Sep. 10, 2021 (JP) ................................ 2021-147252
Mar. 4, 2022 (JP) ................................ 2022-033210

(51) Int. Cl.

| | |
|---|---|
| ***C09C 1/64*** | (2006.01) |
| ***C09C 3/04*** | (2006.01) |
| ***C09D 11/037*** | (2014.01) |
| ***C09D 17/00*** | (2006.01) |

(52) U.S. Cl.

CPC ................ *C09C 1/64* (2013.01); *C09C 3/041* (2013.01); *C09D 11/037* (2013.01); *C09D 17/006* (2013.01)

(58) Field of Classification Search

CPC ... C09C 1/64; C09C 3/041; C09C 2200/1054; C09C 2200/301; C09C 3/006; C09C 3/08; C09D 11/037; C09D 17/006; C09D 7/70; C09D 7/61; C08K 2003/0812; C01P 2004/54; C01P 2004/61; C01P 2004/62; C01P 2006/60

See application file for complete search history.

(56) References Cited

U.S. PATENT DOCUMENTS

| | | | | |
|---|---|---|---|---|
| 6,398,999 | B1 | 6/2002 | Josephy et al. | |
| 2006/0014854 | A1 | 1/2006 | Minami | |
| 2007/0199478 | A1 | 8/2007 | Schlegl et al. | |
| 2008/0145628 | A1 | 6/2008 | Oyanagi et al. | |
| 2009/0258251 | A1 | 10/2009 | Abe et al. | |
| 2010/0194836 | A1 | 8/2010 | Prolss et al. | |
| 2010/0297045 | A1 | 11/2010 | Kaupp et al. | |
| 2018/0194946 | A1 | 7/2018 | Huber et al. | |
| 2018/0230315 | A1* | 8/2018 | Sekiguchi | C09D 11/037 |
| 2019/0390060 | A1 | 12/2019 | Trummer et al. | |
| 2021/0189142 | A1 | 6/2021 | Fudaba et al. | |

FOREIGN PATENT DOCUMENTS

| | | | |
|---|---|---|---|
| JP | H01-119601 | A | 5/1989 |
| JP | 2002-528639 | A | 9/2002 |
| JP | 2003/082258 | A | 3/2003 |
| JP | 2004-196838 | A | 7/2004 |
| JP | 2007-126643 | A | 5/2007 |
| JP | 2007-131741 | A | 5/2007 |
| JP | 2008-174712 | A | 7/2008 |
| JP | 2010-533747 | A | 10/2010 |
| JP | 2012-077222 | A | 4/2012 |
| JP | 2013-040257 | A | 2/2013 |
| JP | 2014-159583 | A | 9/2014 |
| JP | 2018-135460 | A | 8/2018 |
| WO | 2004/087816 | A2 | 10/2004 |
| WO | 2017/030077 | A1 | 2/2017 |
| WO | 2019/077904 | A1 | 4/2019 |

OTHER PUBLICATIONS

ISR issued in International Patent Application No. PCT/JP2022/033291, Nov. 22, 2022, translation.

* cited by examiner

*Primary Examiner* — Anthony J Green
(74) *Attorney, Agent, or Firm* — GREENBLUM & BERNSTEIN, P.L.C.

(57) ABSTRACT

Provided is an aluminum pigment which is excellent in terms of a sense of compactness, optical characteristics, and dispersion/workability, and which can realize a metallic design. In this aluminum pigment, metallic aluminum particles have an average thickness of 0.02-0.20 μm, an average aspect ratio (particle cross section length/particle cross section thickness) of 40-100, and a standard deviation of aspect ratio of 15-70.

11 Claims, 2 Drawing Sheets

ALUMINUM PIGMENT, METHOD FOR PRODUCING ALUMINUM PIGMENT, COATING MATERIAL COMPOSITION CONTAINING ALUMINUM PIGMENT, AND INK COMPOSITION

TECHNICAL FIELD

The present invention relates to an aluminum pigment and a method for producing the same, a coating material composition containing an aluminum pigment, and an ink composition.

BACKGROUND ART

Conventionally, aluminum pigments have been widely used in various fields as pigments having both a unique metallic feel not found in other pigments and excellent hiding power for a base.

In recent years, in coating for automobile bodies, coating for automobile interior parts, metallic coating for optical equipment and the like, attention has been paid to luxurious appearances having more denseness, high luminance, brightness, and glossiness. From the viewpoint of exhibiting values equal to or more than the original functions of the product, it is expected that the appearances will become even more important in the future.

Examples of the method for achieving the excellent appearance properties as described above include microparticulation of the aluminum pigment. It is known that microparticulation of the aluminum pigment is effective in improving the denseness.

However, it is known that microparticulation of the aluminum pigment causes a problem that the orientation of particles in the coating film is lowered, resulting in decrease in the luminance and increase in the generation of scattered light.

On the other hand, a macro-particulated aluminum pigment causes a problem that the particles in the coating film are conspicuous with a glaring graininess.

Examples of the method for remedying such problems include thinning the aluminum particles.

For example, in Patent Document 1, disclosed is an aluminum pigment achieving excellent metallic luster and plating-like appearance, obtainable by extending the grinding time of raw material aluminum powder to thin the aluminum particles.

Further, Patent Documents 2 and 3 disclose a specific thin-film aluminum pigment having improved dispersibility or the like obtainable by specifying the thickness distribution (range of relative width Δh) and aspect ratio of aluminum particles.

Further, in Patent Document 4, disclosed is a method for producing an aluminum pigment by metal vapor deposition, which is totally different from the production method of aluminum pigment by machining process with use of a pulverizer. According to the method, the film thickness of the aluminum particles is set to be thin and uniform, and a product with excellent smoothness is produced, with denseness, high luminance, and high glossiness being obtainable.

Further, in Patent Document 5, proposed is a method of achieving a highly metallic feel by reducing the content of fine particles and specifying the number of particles having a particle size of 1 μm or less in the entire aluminum pigment.

Further, in Patent Document 6, proposed is a method for obtaining a mirror-like metallic design by enhancing the flatness of particles.

PRIOR ART DOCUMENTS

Patent Document

Patent Document 1
JP 2003-82258 A
Patent Document 2
JP 2014-159583 A
Patent Document 3
International Publication No. WO 2004/087816 pamphlet
Patent Document 4
JP 2002-528639A
Patent Document 5
International Publication No. WO 2019/077904 pamphlet
Patent Document 6
International Publication No. WO 2017/030077 pamphlet

SUMMARY OF INVENTION

Technical Problem

The latest design trends in coating for automobile bodies, coating for automobile interior parts, and metallic coating for optical equipment require metallic designs having a denseness and extremely high luminance close to specular reflection in a highlight region in addition to the metallic designs with high luminance and high glossiness that have been traditionally in high demand. However, in near-futuristic designs with many curves and curved surfaces, dark areas increase depending on the viewing angle due to the optical anisotropy characteristic to aluminum pigments, resulting in a problem that the luminance, gloss, and denseness of the design are not exhibited. Therefore, there is a growing demand for metallic designs that maintain high luminance close to specular reflection in the highlight region and has high brightness even in a wide reflection region, that is, metallic designs with less angular dependency, causing less change in color depending on the viewing angle.

Further, along with design sophistication in recent years, aluminum pigments have been microparticulated and thinned, so that the dispersibility in making a coating material tends to deteriorate, which results in deterioration of workability as well as deterioration of designability: Accordingly, there is increasing demand for easy dispersibility.

Also, in the field of inks for high-end printing such as gravure printing, offset printing, and screen printing, there is an increasing demand for the same type of metallic designs and easy dispersibility.

Although the aluminum pigments described in Patent Documents 1 to 3 have an excellent metallic luster obtained by thinly extending aluminum particles, there exists a problem that sufficient characteristics have not yet been obtained from the viewpoint of achieving all of the high denseness, high luminance in a highlight region, high brightness in a wide reflective region, easy dispersibility, and highly glossy feel.

Further, although the aluminum pigment described in Patent Document 4 also has a high denseness and high luminance resulting from production method by vapor deposition, the dispersibility tends to be poor due to the influence of the release agent in the production step. Accordingly, as with the above, there exists a problem that sufficient characteristics have not yet been obtained from the viewpoint of achieving all of the high denseness, high luminance in a highlight region, high brightness in a wide reflective region, easy dispersibility, and high glossiness.

Also, in the aluminum pigment described in Patent Document 5, although the luminance is enhanced by reducing the content of fine particles and specifying the number of particles having a particle size of 1 μm or less in the entire aluminum pigment, graininess of aluminum is not taken into account, so that there exists a problem that sufficient characteristics have not yet been obtained from the viewpoint of achieving all of the high denseness, high luminance in a highlight region, high brightness in a wide reflective region, and high glossiness.

Also, in the aluminum pigment described in Patent Document 6, although a mirror-like metallic design is achieved by improving the flatness of the particles, there exists a problem that sufficient characteristics have not yet been obtained from the viewpoint of achieving the high denseness and high glossiness.

As described above, in any of the conventionally proposed techniques, there exists a problem that no aluminum pigment have not yet been obtained from the viewpoint of achieving all of the high denseness, high luminance in a highlight region, high brightness in a wide reflective region, easy dispersibility and high glossiness.

Accordingly, in view of the above-described problems of the conventional technique, an object of the present invention is to provide an aluminum pigment (composition) for achieving a metallic design excellent in optical properties, satisfying all of the high denseness, high luminance in a highlight region, high brightness in a wide reflective region, easy dispersibility and high glossiness, the pigment having excellent dispersibility/workability.

Solution to Problem

As a result of intensive studies on the above-described problems of the conventional techniques, the present inventors have focused on the cross-sectional shape of metallic aluminum particles and the content of fine particles in an aluminum pigment, and have restricted the content of the fine particles in the aluminum pigment and the flatness of the particles in addition to control of the thickness and aspect ratio of metallic aluminum particles in the cross section of a coating film to specific ranges. It has been found that thereby the aluminum pigment allows metallic designs to have a highly denseness, with high brightness in a wide reflection region while maintaining high luminance close to specular reflection in a highlight region, that is, with less angular dependency causing less change in color depending on the viewing angle, and has excellent dispersibility/workability and glossiness, so that the present invention has been completed.

In other words, the present invention is as follows.

[1]

An aluminum pigment comprising metallic aluminum particles having an average thickness of 0.02 to 0.20 μm, an average aspect ratio (Cross-sectional length of particle/Cross-sectional thickness of particle) of 40 to 100, and a standard deviation of aspect ratio of 15 to 70.

[2]

The aluminum pigment according to item [1], wherein the number ratio of the particles having an aspect ratio of 20 or less is 30% or less to the total.

[3]

The aluminum pigment according to item [1] or [2], wherein the number ratio of the particles having an aspect ratio of 110 or more is 30% or less to the total.

[4] The aluminum pigment according to any one of items [1] to [3], wherein the particles have an arithmetic mean height of surface roughness Sa of 2 to 15 nm.

[5]

The aluminum pigment according to any one of items [1] to [4], wherein the particles have an average thickness of 0.03 to 0.15 μm.

[6]

The aluminum pigment according to any one of items [1] to [5], wherein the particles have an average aspect ratio of 40 to 90.

[7]

The aluminum pigment according to any one of items [1] to [6], wherein the number ratio of the metallic aluminum particles having a particle size of 0.2 to 2.0 μm is 15 to 70% to the total of the metallic aluminum particles.

[8]

The aluminum pigment according to any one of items [1] to [7], wherein the particles comprise planar particles having a flatness (Shortest length/Cross-sectional length of particle) of 0.95 to 1.00, with a number ratio of 60% or more.

[9]

A method for producing the aluminum pigment according to any one of items [1] to [8] comprising a step of grinding raw material metallic aluminum powder with a grinding device, and a step of classifying a slurry after grinding.

[10]

The method for producing the aluminum pigment according to item [9], wherein the step of grinding is performed in two stages.

[11]

A coating material composition comprising the aluminum pigment according to any one of items [1] to [8].

[12]

An ink composition comprising the aluminum pigment according to any one of items [1] to [8].

Advantageous Effects of Invention

According to the present invention, an aluminum pigment (composition) achieving excellent dispersibility/workability and high glossiness in addition to a metallic design having high denseness, high luminance close to specular reflection in a highlight region, and high brightness in a wide reflective region can be provided.

BRIEF DESCRIPTION OF DRAWINGS

In FIG. 1, a white portion corresponds to the cross-sectional area of the metallic aluminum particle, the horizontal direction corresponds to the cross-sectional length of the particle, and the vertical direction corresponds to the cross-sectional thickness of the particle.

In FIG. 2, a white portion mainly corresponds to the particle shape observed from a plane perpendicular to the thickness direction of the metallic aluminum particle.

DESCRIPTION OF EMBODIMENTS

Figure 1:
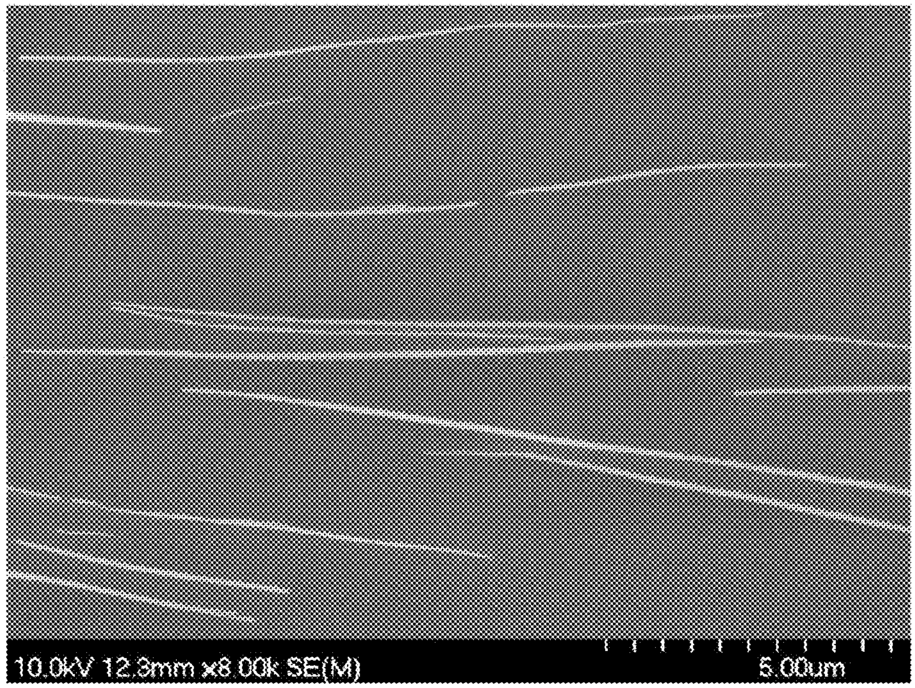
FIG. 1 is a photograph showing an FE-SEM image of a cross section of particles of an aluminum pigment obtained using a field emission type FE-SEM (S-4700, manufactured by HITACHI) for explaining the method for evaluating the cross-sectional thickness and aspect ratio of metallic aluminum particles in the aluminum pigment. In the photograph, horizontally elongated white objects correspond to the metallic aluminum particles.
Figure 2:
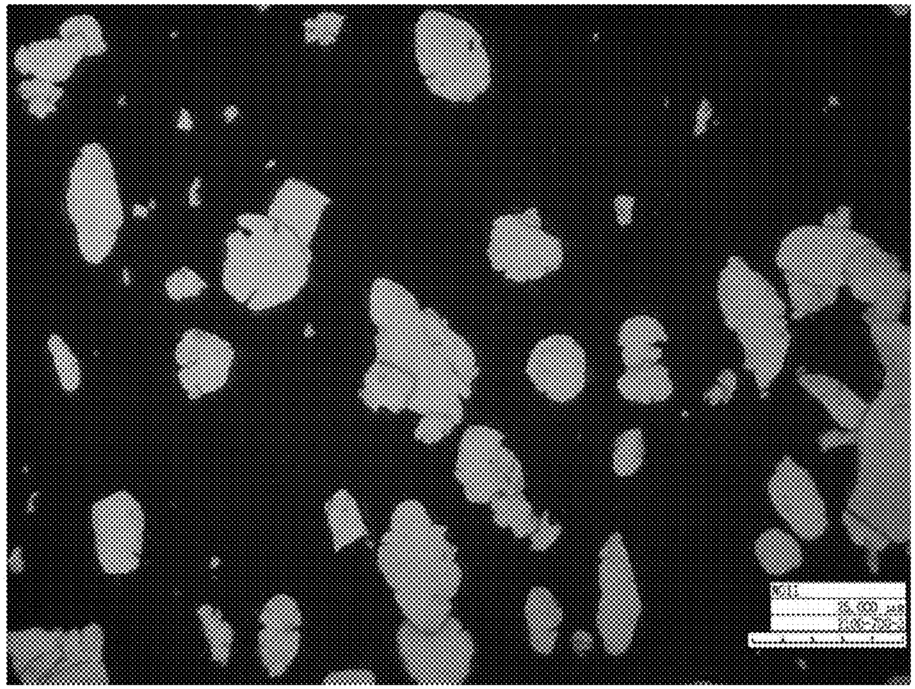
FIG. 2 is a photograph showing an image of the surface of particles in an aluminum pigment for explaining a method for evaluating the number ratio of metallic aluminum particles having a particle size of 0.2 to 2.0 μm in an aluminum pigment, observed using a microscope (KH-3000, manufactured by Hirox Co., Ltd.). In the photograph, circular or irregularly shaped white objects in various sizes correspond to metallic aluminum particles.

Hereinafter, the embodiment of the present invention (hereinafter referred to as "the present embodiment") is described in detail.

The following embodiment is described for illustrating the present invention, and is not intended to limit the present invention to the following contents. The present invention can be modified appropriately within the scope of the gist thereof.

[Aluminum Pigment]

The aluminum pigment of the present embodiment has an average thickness t of metallic aluminum particles of 0.02 to 0.20 μm, an average aspect ratio (Cross-sectional length of particle/Cross-sectional thickness of particle) of 40 to 100, and a standard deviation of aspect ratio of 15 to 70, determined from observation of the cross section.

The metallic aluminum particles contained in the aluminum pigment of the present invention preferably have a thin film-like, scale-like or flake-like shape with a small thickness in a flat shape. The particle size is a measured value in a plane perpendicular to the thickness direction, and the average thickness and the average aspect ratio (Cross-sectional length of particle/Cross-sectional thickness of particle) are measured values in the cross section of the particle.

Regarding the metallic aluminum particles in the aluminum pigment of the present embodiment, the average thickness, the aspect ratio (Cross-sectional length of particle/Cross-sectional thickness of particle), the number ratio (%) of particles having a particle size of 0.2 to 2.0 μm, and the arithmetic mean height Sa (nm) of surface roughness, and the ratio (%) of planar particles are defined as follows.

The average thickness t and the aspect ratio (Cross-sectional length of particle/Cross-sectional thickness of particle) of the metallic aluminum particles are determined by obtaining an FE-SEM image of the cross section of the coating film formed from the coating material composition containing the aluminum pigment of the present embodiment so as to be measured by an image analysis software.

In the FE-SEM image of the cross section of the coating film, the outline of a metallic aluminum particle is extracted along the shape by an image analysis software, and the area and the length in the major axis direction are measured. The cross-sectional area/length of the extracted particle is determined, and the calculated value is defined as the "cross-sectional thickness of particle".

The ratio of the cross-sectional length of a particle to the cross-sectional thickness of a particle (Cross-sectional length of particle/Cross-sectional thickness of particle) is determined, and the calculated value is defined as the "aspect ratio" of the particle.

According to the definition, the aspect ratios of 100 or more particles are determined, and the average value and standard deviation are also determined. Similarly, from the image analysis results, the number ratio of particles having an aspect ratio of 20 or less to the total and the number ratio of particles having an aspect ratio of 110 or more may be determined.

Preparation of the cross section of the coating film, acquisition of the FE-SEM image, and image analysis may be performed by the methods described below in Examples.

In the aluminum pigment of the present embodiment, the metallic aluminum particles have an average thickness obtained from the cross-sectional observation described above of 0.02 to 0.20 μm, an average aspect ratio (Cross-sectional length of particle/Cross-sectional thickness of particle) of 40 to 100, and a standard deviation of the aspect ratio of 15 to 70, so that the luminance and brightness can be improved with the denseness maintained, allowing a desirable design to be obtained.

The cross-sectional thickness t (μm) of the metallic aluminum particles may be determined from the FE-SEM image of the cross section of the coating film used in the measurement of the aspect ratio of the particles with use of an image analysis software.

Specifically, in the FE-SEM image of the cross section of the coating film, the contour of the particle is extracted along the shape using the image analysis software to determine the cross-sectional area/size (length) of the extracted particle, and the calculated value is defined as "cross-sectional thickness of particle". By calculating the arithmetic mean value of the thicknesses of 100 or more particles randomly selected, the average thickness t (μm) of the metallic aluminum particles may be obtained.

The average thickness t (μm) of the metallic aluminum particles in the aluminum pigment of the present embodiment is 0.02 μm to 0.20 μm.

With an average thickness t of 0.02 μm or more, deformation and cracking of the particles can be suppressed, and surface smoothness can be maintained, so that high luminance can be obtained. Further, good dispersibility/workability in making a coating material can be obtained.

With an average thickness t of the particles of 0.20 μm or less, the shaded area of the edge of the particles can be suitably controlled, so that denseness and high glossiness can be obtained.

The average thickness t (μm) of the metallic aluminum particles in the aluminum pigment of the present embodiment is preferably 0.03 μm or more and 0.18 μm or less, more preferably 0.03 μm or more and 0.15 μm or less, and still more preferably 0.04 μm or more and 0.16 μm or less, 0.04 μm or more and 0.14 μm or less, and furthermore preferably 0.05 μm or more and 0.13 μm or less.

Further, the average aspect ratio of the metallic aluminum particles in the aluminum pigment of the present embodiment is 40 to 100.

With an average aspect ratio of 40 or more, high luminance, high brightness in a wide region, and higher hiding power can be obtained, and when used for coating, a dense and smooth coating film can be obtained.

With an average aspect ratio of 100 or less, the warpage, distortion, and cracks of particles can be suppressed.

The average aspect ratio of the metallic aluminum particles in the aluminum pigment of the present embodiment is preferably 40 to 90 or 45 to 95, more preferably 45 to 85, still more preferably 50 to 90, and furthermore preferably is 50 to 80.

Further, the standard deviation of the aspect ratio is 15 to 70. With a standard deviation of the aspect ratio of 15 or more, high brightness can be maintained in a wide reflective region, and the difference in brightness level depending on angles can be suppressed. With a standard deviation of 70 or less, high luminance and high glossiness can be maintained in the specular reflection region.

The standard deviation of the aspect ratio of the aluminum pigment of the present embodiment is preferably 20 to 65.

The number ratio of the particles having an aspect ratio of 20 or less in the aluminum pigment of the present embodiment is preferably 30% or less to the total.

With a number ratio of particles having an aspect ratio of 20 or less controlled to 30% or less to the total, a metallic coating film with higher luminance and metallic feel can be obtained, which is preferable.

The number ratio of the particles having an aspect ratio of 20 or less in the aluminum pigment of the present embodiment is more preferably 20% or less to the total.

It is preferable that in the aluminum pigment of the present embodiment, the number ratio of the metallic aluminum particles having an aspect ratio of 110 or more be 30% or less to the total.

With a number ratio of the particles having an aspect ratio of 110 or more of 30% or less to the total, the warp, distortion, and cracking of particles can be suppressed, which is preferable. Further, the dispersibility/workability in making a coating material is improved, which is preferable.

The number ratio of particles having an aspect ratio of 110 or more in the aluminum pigment of the present embodiment is more preferably 20% or less to the total.

The arithmetic mean height Sa of the surface roughness (unevenness on the particle surface) of the metallic aluminum particles in the aluminum pigment of the present embodiment is an index showing the smoothness of the surface of the aluminum pigment particles, which may be measured by an SPM (Scanning Probe Microscope) including an atomic force microscope.

The arithmetic mean height Sa is preferably 2 to 15 nm.

With an arithmetic mean height Sa of 15 nm or less, the smoothness of the particle surface is high, so that the specularly reflected light intensity increases and higher luminance can be obtained. With an arithmetic mean height Sa of 2 nm or more, the grinding time necessary for producing the aluminum pigment of the present embodiment is not extremely prolonged, resulting in excellent productivity.

The arithmetic mean height Sa is more preferably 2 to 12 nm.

The flatness (Shortest length/Cross-sectional length of particle) of the metallic aluminum particle in the aluminum pigment of the present embodiment may be determined by measuring the acquired FE-SEM image of the cross section of the coating film with an image analysis software.

The measurement method is described below.

In the FE-SEM image of the cross section of the coating film, the measured value of a straight line connecting both ends of the cross section of a particle is defined as the "shortest length". Also, the measured value of the line connecting both ends of the cross section of the particle along the shape of the cross section of the particle is defined as the "cross-sectional length of particle".

The value of the ratio of the shortest length to the cross-sectional length of particle (Shortest length/Cross-sectional length of particle) is defined as the flatness of the particle.

As the flatness approaches 1.00, the particle has less warpage and less distortion.

According to the definition, the flatness of 100 particles is determined.

Regarding the degree of flatness of the particles, with a threshold for discrimination set to 0.95, particles having a flatness in the range of 0.95 to 1.00 are defined as planar particles, and the ratio thereof is determined as the ratio of planar particles (%) (%: number ratio).

It is preferable that the content ratio of the particles having a flatness in the range of 0.95 to 1.00 be 60% or more, so that the luminance of the specular reflection region can be kept high. More preferably, the content ratio is 60% or more and 98% or less.

In the aluminum pigment of the present embodiment, as a method for achieving a more excellent glossiness, it is preferable to have a specific ratio of metallic aluminum particles having a particle size of 0.2 to 2.0 μm. Increase in the size of the aluminum pigment particles is effective in improving the metallic luster. On the other hand, since excess increase in the size of particles of the aluminum pigment results in conspicuous graininess in a coating film, it is preferable that the number ratio of the particles having a specific particle size be controlled to a specific range.

Specifically, in the aluminum pigment in the present embodiment, it is preferable that the number ratio of metallic aluminum particles having a particle size of 0.2 to 2.0 μm be 15 to 70% to the total number of particles determined from the photograph of an image of the particle surface of the aluminum pigment observed through a microscope. With a number ratio of particles having a particle size of 0.2 to 2.0 μm controlled thereto, high glossiness can be achieved with graininess suppressed.

The number ratio of the metallic aluminum particles having a particle size of 0.2 to 2.0 μm in the aluminum pigment of the present embodiment is more preferably 20 to 65%.

The number ratio of the metallic aluminum particles having a particle size of 0.2 to 2.0 μm may be controlled to the preferred range as described above by grinding raw material metallic aluminum powder in two stages in the production method of an aluminum pigment described below; and thereby the effect that the resulting aluminum pigment has a high glossiness can be exhibited.

[Method for Producing Aluminum Pigment]

A method for producing the aluminum pigment of the present embodiment described above is described below.

The method for producing an aluminum pigment in the present embodiment includes a step of grinding raw material metallic aluminum powder (atomized aluminum powder) with a grinding device equipped with a ball mill or the like, and a step of classifying a slurry after grinding. It is preferable that the grinding step include a first-stage step of smoothing and uniformly thinning the aluminum particles, and a second-stage grinding step of controlling the amount of the fine aluminum particles depending on the purpose (that is, performing the grinding step in two stages).

By appropriately adjusting and combining conditions such as the particle size of the atomized aluminum powder used as raw material, the mass of each grinding ball used, the rotation speed of the grinding device, the grinding solvent and the grinding aid, the average thickness of the particles, the aspect ratio (Cross-sectional length of particle/Cross-sectional thickness of particle), and the number ratio of particles having a particle size of 0.2 to 2.0 μm can be adjusted.

<Step of Grinding>

In consideration of the average particle thickness controlled to the range of 0.02 to 0.20 μm, particularly preferable grinding conditions include a combination of the following conditions. As the raw material, atomized aluminum powder having a particle size of preferably 1.0 to 6.0 μm, more preferably 1.5 to 5.0 μm, is used. The mass of each grinding ball used in the grinding device is controlled to preferably 0.08 to 11.00 mg, more preferably 0.08 to 9.00 mg. The rotation speed of the grinding device is controlled to 33% to 78%, more preferably 36% to 57%, of the critical number of revolution (Nc).

<Grinding Ball>

The specific gravity of the grinding balls used in a ball mill or the like is preferably 8 or less, more preferably 7.5 or less, and still more preferably 7 or less, from the viewpoint of enhancing easiness in adjustment of the particles and the viewpoint of increasing the surface smoothness of the aluminum particles.

The specific gravity of the grinding balls is preferably more than the specific gravity of the grinding solvent. With a specific gravity of the grinding balls more than the specific gravity of the grinding solvent, the grinding balls can be prevented from floating on the solvent, so that sufficient shear stress can be obtained between the grinding balls, resulting in tendency of sufficient progress of grinding.

As the grinding balls used in the method for producing the aluminum pigment of the present embodiment, those having high surface smoothness such as stainless steel balls, zirconia balls, and glass balls are preferred from the viewpoints of adjustment of the surface smoothness of the aluminum particles and the durability of the grinding balls.

On the other hand, steel balls, alumina balls and the like, which have low surface smoothness, are not preferred from the viewpoints of adjustment of the surface smoothness of the aluminum particles and the durability of the grinding balls.

Accordingly, for example, in the case of a stainless steel ball, it is preferable to use one having a surface smoothness enhanced by mechanical polishing and chemical polishing.

The mass of each grinding ball is preferably 0.08 to 11.00 mg as described above.

By using grinding balls having a mass of 0.08 mg/piece or more, the occurrence of so-called group motion, which is a phenomenon to make no progress of grinding due to decrease in shear stress between the grinding balls resulting from the movement of the grinding balls in groups or in clusters without individual movement, can be prevented.

Further, by using grinding balls having a mass of 11.00 mg/piece or less, no excessive impact force is applied to the aluminum powder, so that occurrence of warping, distortion, cracking, and the like can be prevented.

Alternatively, instead of a ball mill, a medium stirring mill may be used in the same manner as described above. As the medium stirring mill, for example, a screw type (tower type), a stirring tank type, a circulation tube type, an annular type, or the like may be used.

<Raw Material Metallic Aluminum Powder>

As the atomized aluminum powder used as a raw material (raw material metallic aluminum powder), a powder containing less impurities other than aluminum is preferred.

The purity of the atomized aluminum powder is preferably 99.5% or more, more preferably 99.7% or more, and still more preferably 99.8% or more.

The average particle size of the atomized aluminum powder as raw material is preferably 1.0 to 6.0 μm, more preferably 1.5 to 5.0 μm.

With an atomized aluminum powder having an average particle size of 1.0 μm or more, no excessive energy is applied to the particles during grinding, so that warp and distortion of the particles can be prevented with the particle shape maintained well, which is preferable.

As the shape of the atomized aluminum powder as raw material, ones of spherical powder or teardrop-like powder are preferred. By using those, the shape of the aluminum pigment is less likely to collapse during grinding. In contrast, an acicular powder and an amorphous powder are not preferred because the shape of the aluminum pigment tends to collapse during grinding.

<Grinding Solvent>

It is preferable to use a grinding solvent when producing the aluminum pigment of the present embodiment with a grinding device equipped with a ball mill or the like.

Examples of the types of grinding solvent include conventionally used hydrocarbon solvents such as mineral spirits and solvent naphtha, and low-viscosity solvents such as alcohols, ethers, ketones, and esters, though not limited to thereto.

As a grinding condition for the atomized aluminum powder, the volume of the grinding solvent is preferably 1.5 to 16.0 times, more preferably 2.0 to 12.0 times, the mass of aluminum in the atomized aluminum powder. With a volume of the grinding solvent of 1.5 times or more the mass of aluminum in the atomized aluminum powder, the warping, distortion, cracking and the like caused by long-time grinding of the atomized aluminum powder can be prevented, which is preferable.

Also, with a volume of the grinding solvent of 16.0 times or less the mass of aluminum in the atomized aluminum powder, the uniformity in the mill during grinding is improved, so that the atomized aluminum powder comes into contact with the grinding medium efficiently and grinding tends to proceed favorably.

The ratio of the volume of the grinding balls to the volume of the grinding solvent (Volume of grinding balls/Volume of grinding solvent) is preferably 0.5 to 3.5, more preferably 0.8 to 2.5.

With a ratio of the volume of the grinding balls to the volume of the grinding solvent of 0.5 or more, the uniformity of the grinding balls in the mill during grinding is improved, so that grinding tends to proceed favorably.

Also, with a ratio of the volume of the grinding balls to the volume of the grinding solvent of 3.5 or less, the proportion of the grinding balls in the mill is controlled to a suitable range with a not too high stacking of the balls, so that problems of shape deterioration such as warpage, distortion, and cracking of particles due to grinding stress can be prevented, which is preferable because decrease in luminance and increase in scattered light can be prevented.

<Grinding Aid>

In production of the aluminum pigment of the present embodiment with a grinding device equipped with a ball mill, it is preferable to use a grinding aid in addition to the grinding solvent described above.

Any grinding aid that exhibits properties as a non-leafing pigment may be used, and examples thereof include higher unsaturated fatty acids such as oleic acid; higher aliphatic amines such as stearylamine: higher fatty alcohols such as stearyl alcohol and oleyl alcohol; higher fatty acid amides such as stearic acid amide and oleic acid amide; and higher fatty acid metal salts such as aluminum stearate and aluminum oleate.

It is preferable that the grinding aid be used in an amount of 0.2 to 30 mass % relative to the mass of the atomized aluminum powder.

<Ball Mill>

The ball mill used for grinding the atomized aluminum powder has a diameter of preferably 0.6 m to 2.4 m, more preferably 0.8 m to 2.0 m.

With use of a ball mill having a diameter of 0.6 m or more, the pressure applied to the aluminum particles during grinding is in a suitable range with a not too low stacking of the balls, so that the grinding tends to favorably proceed.

Also, with use of a ball mill having a diameter of 2.4 m or less, problems of shape deterioration such as warpage, distortion, and cracking of particles due to weight of the balls can be prevented with a not too high stacking of the balls, which is preferable because decrease in luminance and increase in scattered light can be prevented.

The rotation speed of the ball mill during grinding of the atomized aluminum powder is preferably 33% to 78%, more preferably 36% to 57%, of the critical number of revolution (Nc), as described above.

With a ratio of rotation speed/critical number of revolution of 33% or more, the uniformity of the aluminum slurry and ball movement in the ball mill is maintained, which is preferable.

Also, with a ratio of rotation speed/critical number of revolution of 78% or less, the grinding balls are prevented from being raked up or falling under their own weight, and the impact force applied to the aluminum particles from the grinding balls is not too high, so that the problem of shape deterioration such as warpage, distortion and cracking of particles is prevented, which is preferable.

Alternatively, the aluminum pigment of the present embodiment may also be produced by vacuum vapor deposition, in addition to the production method including the step of grinding atomized aluminum powder described above.

<Classifying Step>

Further, after the grinding step described above, the slurry of the aluminum pigment of the present embodiment may be subjected to classification to remove particles having a large aspect ratio and particles with a small aspect ratio. Examples of the method include hydrocyclone classification. The classification may be performed by feeding the ground slurry to a two-liquid separation type hydrocyclone classifier and/or a three-liquid separation type hydrocyclone classifier. The classification conditions such as nozzle diameter, flow rate (L/min), and operating pressure (MPa) are appropriately adjusted to optimize the operation of classification according to the purpose.

Further, in the aluminum pigment of the present embodiment, the average value of aspect ratio, the standard deviation, and the number ratio of particles having a particle size of 0.2 to 2.0 μm may be within the numerical ranges described above. Alternatively, a plurality of aluminum pigments having different respective ranges may be mixed in adjustment to eventually achieve the target design.

[Coating Material Composition]

The coating material composition of the present embodiment contains the aluminum pigment of the present embodiment described above.

The coating material composition of the present embodiment may include mica, color pigments, and the like, in addition to the aluminum pigment.

Further, various resins and various additives such as antioxidants, light stabilizers, polymerization inhibitors, and surfactants may be used in combination with the coating material composition of the present embodiment.

The coating material composition of the present embodiment may be produced by mixing an aluminum pigment and various materials on an as needed basis.

The coating material composition of the present embodiment may be used as a metallic coating material.

[Ink Composition]

The ink composition of the present embodiment contains the aluminum pigment of the present embodiment described above.

The ink composition of the present embodiment may include a specific coloring pigment, a solvent and the like, in addition to the aluminum pigment described above.

Further, various resins and various additives such as antioxidants, light stabilizers, polymerization inhibitors, and surfactants may be used in combination with the ink composition of the present embodiment.

The ink composition of the present embodiment may be produced by mixing an aluminum pigment and various materials on an as needed basis, and may be used as a metallic ink.

[Other Uses]

In addition, the aluminum pigment of the present embodiment may be kneaded with a resin or the like for use as a water-resistant binder or a filler.

EXAMPLES

Hereinafter, the present embodiment is described in more detail with reference to Examples and Comparative Examples.

The present embodiment is not limited to the following Examples at all.

The methods for measuring various physical properties in Examples and Comparative Examples are as follows.

[(I) Thickness and Aspect Ratio of Metal Aluminum Particle]

((1) Preparation of Coated Plate)

With use of the aluminum pigments obtained in Examples and Comparative Examples described later, metallic coating materials were prepared from the following compositions.

Aluminum pigment: 1 g

Thinner: 50 g (manufactured by Musashi Paint Co., Ltd., trade name "PLA-ACE Thinner No. 2726")

Acrylic resin: 33 g (manufactured by Musashi Paint Co., Ltd., trade name "PLA-ACE Thinner No. 7160")

The coating material was applied to an ABS resin plate with an air spray device so as to have a dry film thickness of 20 μm, and dried in an oven at 60° C. for 30 minutes to obtain a coated plate for evaluation.

((2) Preparation of Cross Section of Coating Film)

From the coated plate for evaluation prepared as described above, a cross section of the coating film was prepared by the following procedure.

Using scissors, the coated plate for evaluation was cut into 1-cm square pieces.

Using a large rotary microtome (RV-240, manufactured by Yamato Kohki Industrial Co., Ltd.), the cross section of the coating film of a fragmented 1-cm square coated plate for evaluation was repeatedly cut to remove protrusions of micro aluminum/acrylic resin on the cross section.

Using an ion milling device (IB-09010CP, manufactured by JEOL Ltd.), a shielding plate position of the resulting cross section of the coating film was set to achieve ion-beam irradiation 20 μm away from the cross section of the coating film, and an ion milling treatment was performed to prepare a cross section of the coating film for acquisition of an FE-SEM image to be described later.

((3) Acquisition of Cross Section of Particle (FE-SEM Image))

The cross section of the coating film (coated plate) obtained in ((2) Preparation of cross section of coating film) was adhered so as to be parallel to the SEM sample stage, and an FE-SEM image of the cross section of the coating film was acquired using a field emission type FE-SEM (S-4700, manufactured by Hitachi, Ltd.).

The conditions for the observation/acquisition of FE-SEM images include photographing at an acceleration voltage setting adjusted to 10 kV and an image magnification of 3000 to 10000, which was appropriately changed depending on the size of the particle so that the particle fit inside the field of view:

In addition, before acquiring (capturing) an FE-SEM image, an electronic axis alignment was performed so that the boundary line between the aluminum particles and the acrylic resin in the FE-SEM image was not distorted, and the luminance and contrast were properly set so as to clearly and definitely identify the particle. The photograph was taken at a high resolution of 2560×1920 pixels. Only a clear image without cracks or damage during ion milling of the cross-section of a sample was used as the image for measurement, and the image was not subjected to image processing.

((4) Analysis (Particle Size Measurement in Cross Section: Particle Thickness, Aspect Ratio))

The FE-SEM image obtained by the procedure for acquiring the particle cross section (FE-SEM image) in ((I)-(3)) was subjected to measurement of the length and area of the particle in the cross section of the aluminum particles using an image analysis software Image Pro Plus version 7.0 (manufactured by Media Cybernetics, Inc.), and the thickness and aspect ratio were calculated.

The FE-SEM image for measuring the length and area of particles in the cross section of aluminum particles was read into the image analysis software, and space calibration was performed to set the scale length/unit.

The particle contour was then accurately extracted and measurement values of two items including the area and the size (length) were acquired. The particle was extracted using a free-form curve AOI tool and converted into an object. Further, the object was corrected while enlarging the particle image appropriately; so that the outline of the particle was extracted accurately. Particles extending outside the image and unclear particles were excluded from the measurement.

The measured particle size (length) was defined as "cross-sectional length of particle", and the calculated value of the ratio of the area to the size (length) (Area/Size (length)) was defined as "cross-sectional thickness of particle". The calculated value of the ratio of cross-sectional length of particle to cross-sectional thickness of particle (Cross-sectional length of particle/Cross-sectional thickness of particle) was defined as "aspect ratio of particle".

Cross-sectional length of particle=Measured value of size (length)

Cross-sectional thickness of particle=Calculated value of area/Size (length)

Aspect ratio-Cross-sectional length of particle/Cross-sectional thickness of particle The procedure was repeated to determine the values of the aspect ratio of 100 or more particles.

((II) Evaluation of Average Thickness, Average Aspect Ratio, Standard Deviation of Aspect Ratio, and Number Ratio of Metallic Aluminum Particles)

The overall average value of cross-sectional thickness (Area/Size (length)) (average thickness t) and the average value of aspect ratio (Cross-sectional length of particle/Cross-sectional thickness of particle) (average aspect ratio) of 100 or more particles obtained by the analysis ((I)-(4)) described above, the standard deviation of the aspect ratio, and the number ratio of particles having an aspect ratio in the range of 20 or less and 110 or more to the whole were determined.

[(III) Analysis (Particle Size Measurement in Cross Section: Flatness of Particle)]

((1) Evaluation of Flatness of Particle)

The FE-SEM image obtained by the procedure for acquiring the cross section of particle (FE-SEM image) in ((I)-(3)) was subjected to measurement of the flatness of an aluminum particle (Shortest length/Cross-sectional length of particle) using an image analysis software Win Roof version 5.5 (manufactured by MITANI CORPORATION).

Figure 3:
FIG. 3 is a photograph showing an FE-SEM image of a cross section of particles of an aluminum pigment, obtained using a field emission-type FE-SEM (S-4700, manufactured by HITACHI) for explaining the method of evaluating the flatness of particles of the aluminum pigment.

In FIG. 3, an image for measurement of the flatness (Shortest length/Cross-sectional length of particle) of particles is shown.

The straight line tool and the curved line tool of an image analysis software Win Roof version 5.5 were selected, and the measured value obtained by connecting both ends of an aluminum particle in the cross section with a straight line was defined as shortest length, the measured value of the line obtained by connecting both ends along the cross section of the aluminum particle was defined as cross sectional length of particle, and the value of (Shortest length/Cross-sectional length of particle) was defined as the flatness of the aluminum particle.

The procedure was repeated to obtain values of flatness of 100 particles.

The aluminum particles selected for obtaining the values of flatness had a size within ±50% of the average particle size d50, which will be described later.

As the flatness value approaches 1.00, the degrees of warpage, distortion and the like decrease.

((2) Average Particle Size d50)

The average particle size (d50) of the aluminum pigment was measured with a laser diffraction/scattering particle size distribution analyzer (LA-300, manufactured by Horiba, Ltd.).

A mineral spirit was used as the measurement solvent.

The measurement was performed according to the equipment instruction manual. As a point to be considered, the sample aluminum pigment was subjected to ultrasonic dispersion for 2 minutes as a pretreatment, then put into a dispersion tank, and measurement was started after confirmation of the appropriate concentration.

After the measurement was completed, d50 was automatically displayed.

((3) Ratio of Planar Particles)

From the values of flatness (Shortest length/Cross-sectional length of particle) of 100 particles obtained as described above, the threshold for flatness of the particles was set to 0.95, and the ratio of aluminum particles having a flatness within the range of 0.95 to 1.00 was determined.

In the aluminum pigment of the present embodiment, the number ratio of planar particles having a flatness in the range of 0.95 to 1.00 was 60% or more.

[(IV) Number Ratio of Particles Having Particle Size of 0.2 to 2.0 μm]

((1) Preparation of Coated Plate)

Using the aluminum pigments obtained in Examples and Comparative Examples described later, metallic coating materials were prepared with the following composition.

Aluminum pigment: 0.25 g

Thinner: 12.75 g (manufactured by Kansai Paint Co., Ltd., trade name "Acrylic 2000GL Thinner")

Acrylic resin: 97.00 g (manufactured by Kansai Paint Co., Ltd., trade name "Acrylic 2000 Clear")

Next, the prepared coating material was shaken with a paint shaker for 10 minutes, applied to a hiding ratio test paper (manufactured by Taiyu Kizai Co., Ltd., trade name: Hiding ratio test paper H-100, compliant to JIS) with a bar coater No. 6, and dried at room temperature to obtain a coated plate for evaluation.

((2) Acquisition of Observation Image of Particle Surface of Aluminum Pigment)

The coating film (coated plate) obtained in ((1) Preparation of coated plate) was observed with a microscope (KH-3000, manufactured by Hirox) to obtain an observation image of the particle surface of the coating film.

The image magnification was set to 2100, and 10 fields of view were photographed for each sample.

((3) Analysis (Particle Count, Size Measurement))

The image obtained by the observation image acquisition procedure of the aluminum pigment particle surface in ((IV)-(2)) was analyzed by an image analysis software Image Pro Plus version 7.0 (manufactured by Media Cybernetics, Inc.). The diameters of all the aluminum particles clearly identified without being discontinuous in the image were measured. The total number of particles was set to 100 or more, and the number ratio of the particles having a size of 0.2 to 2.0 μm to the total was calculated. On this occasion, particles having an unclear shape due to overlapping of particles, and particles having an unclear contour that is hardly identified were excluded from the measurement.

In the method of extracting the particles, the contours of the particles were accurately extracted by manual measurement, and the size (average) was selected as the measurement item to determine the value of the size of the particles.

((4) Evaluation of Number Ratio of Particles Having a Particle Size of 0.2 to 2.0 μm)

The analysis of ((IV)-(3)) was performed for 10 fields per sample, and the number ratio of the particles having a size (average) of 0.2 to 2.0 μm to a total of 100 or more aluminum particles for all the 10 fields was determined.

In the case where the number of measured particles was less than 100, images were acquired again and the number of fields of view was increased to increase the number of measured particles to 100 or more.

[(V) Arithmetic Mean Height of Surface Roughness of Particles: Sa]

The arithmetic mean height of the surface roughness of the metallic aluminum particles Sa in the aluminum pigment was measured by the following method.

((1) Pretreatment)

Since the aluminum pigments obtained in Examples and Comparative Examples described later were a mixture with a mineral spirit and solvent naphtha, they were subjected to washing.

An Al paste (aluminum pigment) in an amount of 100 mg was collected in a screw tube, and 5 mL of toluene was added thereto.

The mixture was shaken by hand for several ten seconds to be dispersed, and subjected to centrifugation.

After removal of the supernatant, 5 mL of toluene was added again, and dispersion and centrifugation were performed in the same manner.

A small amount (about several mg) of the precipitated Al paste was collected, dispersed in 5 mL of toluene, dropped onto a 1 cm square silicon wafer, and air-dried.

((2) Acquisition of Image for Measurement)

The arithmetic mean height of surface roughness Sa of particles was measured under the following conditions.

Particles allowing a field of view of 4 μm square were selected, and an image for measurement was acquired under the following conditions.

Device: AFM5100N manufactured by Hitachi High-Tech Corporation

Measurement mode: DFM

Probe: PRC-DF40P

Measurement field of view: 4 μm square, 512 pixels ((3) Analysis and Calculation of Sa)

Analysis was performed using an analysis software attached to the apparatus.

After performing the primary tilt correction, Sa was calculated using a roughness analysis function.

Software: AFM5000II

Correction after measurement: primary tilt correction

Roughness measurement: Sa (automatic calculation)

[(VI) Evaluation of Denseness, Luminance, Brightness, and Glossiness]

((1) Preparation of Coating Material and Coated Plate)

Using the aluminum pigments obtained in Examples and Comparative Examples described later, metallic coating materials were prepared from the following composition.

Aluminum pigment: 1.25 g

Mixed thinner: 8.75 g (Solvent mixing ratio: 40 mass % of methyl ethyl ketone, 40 mass % of ethyl acetate, and 20 mass % of isopropyl alcohol)

Polyurethane resin: 4.00 g (trade name "SANPRENE IB Series 1700D", manufactured by Sanyo Chemical Industries, Ltd.)

Next, the prepared coating material was dispersed with a magnetic stirrer at a number of revolution of 500 rpm for 20 minutes, applied on a PET film with a bar coater No. 6 and dried at room temperature to obtain a coated plate for evaluation.

((2) Measurement of Denseness, Luminance, Brightness and Glossiness)

(i) Denseness

An evaluation index for denseness, the graininess was evaluated using BYK-mac (manufactured by BYK Gardner GmbH).

In order to evaluate graininess, diffused light (−15 degrees, 45 degrees, 75 degrees) was detected by a detector camera (0 degrees), and the uniformity in the light and dark portions was expressed numerically.

The measured value of the uniformity in the light and dark portions was determined by reading the value of graininess, which represents more denseness as the value decreases.

(ii) Luminance and Brightness

The luminance and brightness were evaluated using a color meter VC-2 (manufactured by Suga Test Instruments Co., Ltd.).

The luminance was measured at an incident angle of 45 degrees and a light receiving angle of 5 degrees (L5), which is close to specular light, with the light reflected on the coating film surface in the specular reflection area excluded. Further, the brightness was measured at a light receiving angle shifted by 50 degrees to 55 degrees (L55).

The luminance is a parameter proportional to the specular reflection light intensity from the aluminum pigment. As the measurement value increases, the specular reflection light intensity is enhanced, so that the luminance is determined as excellent.

The changes in brightness different depending on angle can be captured, and as the L value for each angle increases, the intensity of the light reflected at that angle is enhanced, and it was determined that the larger the measured value is, the higher the brightness is.

(iii) Glossiness

Glossiness was evaluated using UGV-5D (manufactured by Suga Test Instruments Co., Ltd.). In the measurement of reflectance with an incident angle of 60 degrees and a light receiving angle of 60 degrees respectively according to mirror glossiness at 60 degrees, it was determined that higher the specular reflectance at 60 degrees is, the higher the glossiness of the coating film is, resulting in more excellent optical properties.

[(VII) Evaluation of Easy Dispersibility]

((1) Preparation of Evaluation Sample)

Using the aluminum pigments obtained in Examples and Comparative Examples described later, samples for evaluation were prepared from the following composition.

(i) In a disposable cup (500 ml), 10 g of an aluminum pigment sample was weighed.

(ii) To the (i), 100 ml of xylene was added to obtain a test sample.

((2) Evaluation of Easy Dispersibility Test)

The evaluation sample prepared in (1) was subjected to a test by the following method for determination.

(i) The test sample was dispersed by stirring at 500 rpm with a three-one motor for 1 minute.

(ii) The dispersion was transferred to another disposable cup and the presence or absence of an undispersed sample on the bottom of the disposable cup was checked.

(iii) When an undispersed sample was present, the transferred dispersion was returned and the measurement operations from (i) to (ii) were repeated until the undispersed sample disappeared.

(iv) Based on the time required for disappearance of the undispersed sample, the dispersibility was determined to be better with decrease in the time required.

Example A1

A ball mill having an inner diameter of 2 m and a length of 30 cm was filled with a formulation including 9.5 kg of raw material metal-atomized aluminum powder (average particle size: 2.1 μm), 45.8 kg of mineral spirit, and 570 g of oleic acid, and the formulation was ground using 309 kg of zirconia balls having a diameter of 0.8 mm.

Zirconia balls containing 94 mass % or more of $ZrO_2$ as a main component and having a circularity of 95% or more were used.

The number of revolution of the ball mill was set to 13 rpm (ratio of rotation speed/critical number of revolution: 43%), and grinding was performed for 150 hours.

After grinding, the slurry in the mill was washed out with mineral spirit and classified using a liquid cyclone classifier. First, the top nozzle diameter was set to 5 mm, the bottom nozzle diameter was set to 2 mm, and a pressure was set to 0.4 MPa. The slurry was then fed to a two-liquid separation type hydrocyclone classifier to obtain a classified slurry on the top side. Next, the top nozzle diameter was set to 3 mm, the middle nozzle diameter was set to 6 mm, the bottom nozzle diameter was set to 1.5 mm, and the pressure was set to 0.6 MPa. Further, the slurry was fed to a three-liquid separation type hydrocyclone classifier to obtain a classified slurry on the bottom side. The slurry obtained by the classification was filtered with a filter and concentrated to obtain a cake with a heating residue of 76 mass %.

To the resulting cake transferred into a vertical mixer, a predetermined amount of solvent naphtha was added, and the mixture was mixed for 20 minutes to obtain an aluminum pigment having a heating residue of 66 mass %.

The resulting aluminum pigment was subjected to evaluation of the average thickness of the metallic aluminum particles, the average aspect ratio, the standard deviation of the aspect ratio, the number ratio of particles having an aspect ratio of 20 or less, and the number ratio of particles having an aspect ratio of 110 or more, the ratio of planar particles, the arithmetic mean height of surface roughness Sa of particles, and the number ratio of particles having a particle size of 0.2 to 2.0 μm according to (I) to (V) described above, and evaluation of the denseness, the luminance, the brightness, the easy dispersibility, and the glossiness according to (VI) and (VII) described above. The evaluation results are shown in Table A1.

Example A2

Grinding was performed on a raw material metal-atomized aluminum powder (average particle size: 2.5 μm) using zirconia balls having a diameter of 1.3 mm.

The number of revolution of the ball mill was set to 17 rpm (ratio of rotation speed/critical number of revolution: 57%), and grinding was performed for 50 hours.

In the other conditions, same operations as in [Example A1] were performed to obtain an aluminum pigment having a heating residue of 70 mass %.

The resulting aluminum pigment was subjected to evaluation of the denseness, the luminance, the brightness, the easy dispersibility, and the glossiness according to (VI) and (VII) described above. The evaluation results are shown in Table A1.

Example A3

The aluminum pigments obtained in the following (1) and (2) were mixed at a ratio of 1:1 to obtain an aluminum pigment.

(1)

Using a raw material metal-atomized aluminum powder (average particle size: 1.9 μm), filling with a formulation of 53.4 kg of mineral spirit and 950 g of oleic acid was performed, and grinding was performed with 309 kg of zirconia balls having a diameter of 1.7 mm.

The number of revolution of the ball mill was set to 13 rpm (ratio of rotation speed/critical number of revolution: 43%), and grinding was performed for 80 hours.

In the other conditions, the same operations as in [Example A1] were performed to obtain an aluminum pigment having a heating residue of 68 mass %.

(2)

In addition, using a raw material metal-atomized aluminum powder (average particle size: 2.8 μm), the other conditions were the same as in (1) described above to obtain an aluminum pigment having a heating residue of 70 mass %.

(3)

The resulting aluminum pigment was subjected to evaluation of the denseness, the luminance, the brightness, the easy dispersibility, and the glossiness according to (VI) and (VII) described above. The evaluation results are shown in Table A1.

Example A4

The number of revolution of the ball mill was set to 17 rpm (ratio of rotation speed/critical number of revolution: 57%).

In the other conditions, the same operations as in [Example A1] were performed.

The resulting aluminum pigment was subjected to evaluation of the denseness, the luminance, the brightness, the easy dispersibility, and the glossiness according to (VI) and (VII) described above. The evaluation results are shown in Table A1.

Comparative Example A1

Grinding was performed using the same formulation and grinding conditions as in [Example A1] described above.

After grinding, the slurry in the mill was washed out with mineral spirit, fed to a 400-mesh vibrating sieve to remove coarse particles, filtered with a filter and concentrated to obtain a cake having a heating residue of 74 mass % (no classification step was performed).

The resulting cake was transferred into a vertical mixer, and a predetermined amount of solvent naphtha was added thereto. The mixture was mixed for 20 minutes to obtain an aluminum pigment having a heating residue of 64 mass %.

The resulting aluminum pigment was subjected to evaluation of the denseness, the luminance, the brightness, the easy dispersibility, and the glossiness according to (VI) and (VII) described above. The evaluation results are shown in Table A1.

Comparative Example A2

Grinding was performed using the ball mill filled with the same formulation as in [Example A1] described above and by changing the number of revolution of the ball mill to 25 rpm (ratio of rotation speed/critical number of revolution: 83%).

After grinding, the slurry in the mill was washed out with mineral spirit, fed to a 400-mesh vibrating sieve to remove coarse particles, filtered with a filter and concentrated to obtain a cake having a heating residue of 72 mass % (no classification step was performed).

The resulting cake was transferred into a vertical mixer, and a predetermined amount of solvent naphtha was added thereto. The mixture was mixed for 20 minutes to obtain an aluminum pigment having a heating residue of 62 mass %.

The resulting aluminum pigment was subjected to evaluation of the denseness, the luminance, the brightness, the easy dispersibility, and the glossiness according to (VI) and (VII) described above. The evaluation results are shown in Table A1.

Comparative Example 3

Grinding was performed on a raw material metal-atomized aluminum powder (average particle size: 6.5 μm). Regarding the other formulations and the grinding conditions, the same operations as in [Example A1] were performed.

After grinding, the slurry in the mill was washed out with mineral spirit, fed to a 400-mesh vibrating sieve to remove coarse particles, filtered with a filter and concentrated to obtain a cake having a heating residue of 76 mass % (no classification step was performed).

The resulting cake was transferred into a vertical mixer, and a predetermined amount of solvent naphtha was added thereto. The mixture was mixed for 20 minutes to obtain an aluminum pigment having a heating residue of 66 mass %.

The resulting aluminum pigment was subjected to evaluation of the denseness, the luminance, the brightness, the easy dispersibility, and the glossiness according to (VI) and (VII) described above. The evaluation results are shown in Table A1.

Comparative Example 4

Grinding was performed on a raw material metal-atomized aluminum powder (average particle size: 2.2 μm).

Grinding was performed for 110 hours, by setting the number of revolution of the ball mill to 11 rpm (ratio of rotation speed/critical number of revolution: 37%).

Regarding the other formulations and the grinding conditions, the same operations as in [Example A1] were performed.

After grinding, the slurry in the mill was washed out with mineral spirit, fed to a 400-mesh vibrating sieve to remove coarse particles, filtered with a filter and concentrated to obtain a cake having a heating residue of 78 mass % (no classification step was performed).

The resulting cake was transferred into a vertical mixer, and a predetermined amount of solvent naphtha was added thereto. The mixture was mixed for 20 minutes to obtain an aluminum pigment having a heating residue of 68 mass %.

The resulting aluminum pigment was subjected to evaluation of the denseness, the luminance, the brightness, the easy dispersibility, and the glossiness according to (VI) and (VII) described above. The evaluation results are shown in Table A1.

TABLE A1

| | Average particle thickness (μm) | Average aspect ratio | Standard deviation of aspect ratio | Ratio of particles having aspect ratio of 20 or less (%) | Ratio of particles having aspect ratio of 110 or more (%) | Arithmetic mean height Sa (nm) | Ratio of particles having particle size of 0.2 to 2.0 μm (%) |
|---|---|---|---|---|---|---|---|
| Example A1 | 0.067 | 67.9 | 32.0 | 7.2 | 11.3 | 6.2 | 12.0 |
| Example A2 | 0.135 | 42.3 | 17.9 | 6.5 | 0 | 8.5 | 8.2 |

TABLE A1-continued

| | | | | | | | |
|---|---|---|---|---|---|---|---|
| Example A3 | 0.085 | 51.8 | 22.1 | 13.3 | 2.2 | 9.3 | 10.3 |
| Example A4 | 0.043 | 84.8 | 44.7 | 8.5 | 24.6 | 10.5 | 14.4 |
| Comparative Example A1 | 0.061 | 91.0 | 70.4 | 30.9 | 35.5 | 9.1 | 13.5 |
| Comparative Example A2 | 0.039 | 102.2 | 69.1 | 30.1 | 36.2 | 21.3 | 70.4 |
| Comparative Example A3 | 0.223 | 78.9 | 55.5 | 32.1 | 34.1 | 12.2 | 11.6 |
| Comparative Example A4 | 0.075 | 53.5 | 14.8 | 31.6 | 0 | 5.4 | 7.8 |

| | The ratio of planar particles | Denseness/ Graininess | Luminance L5 | Brightness L55 | Easy dispersibility (minute) | Glossiness |
|---|---|---|---|---|---|---|
| Example A1 | 67 | 2.3 | 490 | 20 | 3 | 131 |
| Example A2 | 71 | 2.6 | 478 | 18 | 2 | 112 |
| Example A3 | 64 | 2.4 | 460 | 19 | 3 | 119 |
| Example A4 | 61 | 1.9 | 534 | 21 | 3 | 140 |
| Comparative Example A1 | 66 | 2.4 | 394 | 10 | 7 | 132 |
| Comparative Example A2 | 58 | 1.9 | 378 | 9 | 8 | 138 |
| Comparative Example A3 | 69 | 3.7 | 470 | 10 | 6 | 123 |
| Comparative Example A4 | 78 | 2.4 | 464 | 9 | 3 | 119 |

From Table A1, it was found that the aluminum pigment of the present invention is dense, has extremely high luminance and brightness, and also has good dispersion/workability.

Example B1

A ball mill having an inner diameter of 2 m and a length of 30 cm was filled with a formulation including 9.5 kg of raw material metal-atomized aluminum powder (average particle size: 2.4 μm), 45.8 kg of mineral spirit, and 570 g of oleic acid, and the formulation was ground using 309 kg of zirconia balls having a diameter of 0.8 mm.

Zirconia balls containing 94 mass % or more of $ZrO_2$ as a main component and having a circularity of 95% or more were used.

The number of revolution of the ball mill was set to 13 rpm (ratio of rotation speed/critical number of revolution: 43%), and the first-stage grinding was performed over 100 hours.

After the first-stage grinding, 9.2 kg of mineral spirit and 114 g of oleic acid were added to the ball mill, the number of revolution of the ball mill was set to 23 rpm (ratio of rotation speed/critical number of revolution: 77%), and the second-stage grinding was performed over 6 hours.

After grinding, the slurry in the mill was washed out with mineral spirit and classified using a liquid cyclone classifier. The top nozzle diameter was set to 5 mm, the bottom nozzle diameter was set to 2 mm, and a pressure was set to 0.4 MPa. The slurry was then fed to a two-liquid separation type hydrocyclone classifier to obtain a classified slurry on the top side. The slurry obtained by the classification was filtered with a filter and concentrated to obtain a cake having a heating residue of 76 mass %.

To the resulting cake transferred into a vertical mixer, a predetermined amount of solvent naphtha was added, and the mixture was mixed for 20 minutes to obtain an aluminum pigment having a heating residue of 66 mass %.

The resulting aluminum pigment was subjected to evaluation of the average thickness of the metallic aluminum particles, the average aspect ratio, the standard deviation of the aspect ratio, the number ratio of particles having an aspect ratio of 20 or less, and the number ratio of particles having an aspect ratio of 110 or more, the ratio of planar particles, the arithmetic mean height of surface roughness Sa of particles, and the number ratio of particles having a particle size of 0.2 to 2.0 μm according to (I) to (V) described above, and evaluation of the denseness, the luminance, the brightness, the easy dispersibility, and the glossiness according to (VI) and (VII) described above. The evaluation results are shown in Table B1.

Example B2

Grinding was performed on a raw material metal-atomized aluminum powder (average particle size: 2.5 μm) using zirconia balls having a diameter of 1.3 mm.

In the first-stage grinding conditions, the number of revolution of the ball mill was set to 10 rpm (ratio of rotation speed/critical number of revolution: 33%), and the grinding was performed for 60 hours.

In the second-stage grinding conditions, the number of revolution of the ball mill was set to 23 rpm (ratio of rotation speed/critical number of revolution: 77%), and the grinding was performed for 10 hours. In the other conditions, the same operations as in [Example B1] were performed to obtain an aluminum pigment having a heating residue of 68 mass %

The resulting aluminum pigment was subjected to evaluation of the denseness, the luminance, the brightness, the easy dispersibility, and the glossiness according to (VI) and (VII) described above. The evaluation results are shown in Table B1.

Example B3

Grinding was performed on a raw material metal-atomized aluminum powder (average particle size: 2.3 μm) using zirconia balls having a diameter of 1.0 mm.

In the first-stage grinding conditions, the number of revolution of the ball mill was set to 11 rpm (ratio of rotation speed/critical number of revolution: 37%), and the grinding was performed for 70 hours.

In the second-stage grinding conditions, the number of revolution of the ball mill was set to 23 rpm (ratio of rotation speed/critical number of revolution: 77%), and the grinding was performed for 7 hours. In the other conditions, the same operations as in [Example B1] were performed to obtain an aluminum pigment having a heating residue of 66 mass %

The resulting aluminum pigment was subjected to evaluation of the denseness, the luminance, the brightness, the easy dispersibility, and the glossiness according to (VI) and (VII) described above. The evaluation results are shown in Table B1.

Example B4

Grinding was performed on a raw material metal-atomized aluminum powder (average particle size: 3.2 μm) using zirconia balls having a diameter of 1.7 mm.

In the first-stage grinding conditions, the number of revolution of the ball mill was set to 10 rpm (ratio of rotation speed/critical number of revolution: 33%), and the grinding was performed for 45 hours.

In the second-stage grinding conditions, the number of revolution of the ball mill was set to 23 rpm (ratio of rotation speed/critical number of revolution: 77%), and the grinding was performed for 12 hours. In the other conditions, the same operations as in [Example B1] were performed to obtain an aluminum pigment having a heating residue of 70 mass %

The resulting aluminum pigment was subjected to evaluation of the denseness, the luminance, the brightness, the easy dispersibility, and the glossiness according to (VI) and (VII) described above. The evaluation results are shown in Table B1.

Example B5

Grinding was performed on a raw material metal-atomized aluminum powder (average particle size: 2.8 μm) using zirconia balls having a diameter of 1.3 mm.

In the first-stage grinding conditions, the number of revolution of the ball mill was set to 12 rpm (ratio of rotation speed/critical number of revolution: 40%), and the grinding was performed for 50 hours.

In the other conditions, the same operations as in [Example B1] were performed to obtain an aluminum pigment having a heating residue of 69 mass %

The resulting aluminum pigment was subjected to evaluation of the denseness, the luminance, the brightness, the easy dispersibility, and the glossiness according to (VI) and (VII) described above. The evaluation results are shown in Table B1.

Comparative Example B1

Grinding was performed using the ball mill filled with the same formulation as in [Example B1] described above and the first-stage grinding conditions with a number of revolution of the ball mill of 6 rpm (ratio of rotation speed/critical number of revolution: 20%) for 100 hours.

In the second-stage grinding conditions, the number of revolution of the ball mill was set to 6 rpm (ratio of rotation speed/critical number of revolution: 20%) as in the first stage, and grinding was performed for 8 hours.

In the other conditions, the same operations as in [Example B1] were performed to obtain an aluminum pigment having a heating residue of 70 mass %.

The resulting aluminum pigment was subjected to evaluation of the denseness, the luminance, the brightness, the easy dispersibility, and the glossiness according to (VI) and (VII) described above. The evaluation results are shown in Table B1.

Comparative Example B2

Using the same raw material metal-atomized aluminum powder as in [Example B1] described above, filling with a formulation of 42 kg of mineral spirit and 950 g of stearyl amine was performed, and grinding was performed with 408 kg of steel balls having a diameter of 0.8 mm.

Under the first-stage grinding conditions with a number of revolution of the ball mill set to 13 rpm (ratio of rotation speed/critical number of revolution: 43%), grinding was performed.

After the first-stage grinding, 8.4 kg of mineral spirit and 190 g of stearyl amine were added into the ball mill, and then the second-stage grinding was performed with the number of revolution of the ball mill set to 23 rpm (ratio of rotation speed/critical number of revolution: 77%) over 8 hours.

In the other conditions, the same operations as in [Example B1] were performed to obtain an aluminum pigment having a heating residue of 64 mass %.

The resulting aluminum pigment was subjected to evaluation of the denseness, the luminance, the brightness, the easy dispersibility, and the glossiness according to (VI) and (VII) described above. The evaluation results are shown in Table B1.

Comparative Example B3

A first-stage grinding was performed on a raw material metal-atomized aluminum powder (average particle size: 6.2 μm).

In the second-stage grinding conditions, the number of revolution of the ball mill was set to 6 rpm (ratio of rotation speed/critical number of revolution: 20%), and grinding was performed for 8 hours.

Regarding the other formulations and the grinding conditions, the same operations as in [Example B1] were performed.

After grinding, the slurry in the mill was washed out with mineral spirit, fed to a 400-mesh vibrating sieve to remove coarse particles, filtered with a filter and concentrated to obtain a cake having a heating residue of 78 mass % (no classification step was performed).

The resulting cake was transferred into a vertical mixer, and a predetermined amount of solvent naphtha was added thereto. The mixture was mixed for 20 minutes to obtain an aluminum pigment having a heating residue of 68 mass %.

The resulting aluminum pigment was subjected to evaluation of the denseness, the luminance, the brightness, the easy dispersibility, and the glossiness according to (VI) and (VII) described above. The evaluation results are shown in Table B1.

Comparative Example B4

A metal vapor deposited aluminum pigment Metalure L 55700 manufactured by Eckart GmbH (no grinding or classifying process) was subjected to evaluation of the denseness, the luminance, the brightness, the easy dispersibility, and the glossiness according to (VI) and (VII) described above. The evaluation results are shown in Table B1.

TABLE B1

| | Average particle thickness (μm) | Average aspect ratio | Standard deviation of aspect ratio | Ratio of particles having aspect ratio of 20 or less (%) | Ratio of particles having aspect ratio of 110 or more (%) | Arithmetic mean height Sa (nm) | Ratio of particles having particle size of 0.2 to 2.0 μm (%) |
|---|---|---|---|---|---|---|---|
| Example B1 | 0.060 | 70.2 | 47.1 | 31.2 | 6.8 | 7.6 | 28.4 |
| Example B2 | 0.084 | 67.6 | 34.9 | 33.1 | 3.2 | 3.5 | 35.8 |
| Example B3 | 0.076 | 64.9 | 40.9 | 35.4 | 4.2 | 11.8 | 36.8 |
| Example B4 | 0.178 | 46.1 | 17.2 | 33.9 | 0 | 8.9 | 65.4 |
| Example B5 | 0.130 | 55.3 | 26.4 | 32.0 | 5.3 | 14.0 | 51.2 |
| Comparative Example B1 | 0.192 | 28.7 | 16.2 | 35.0 | 0 | 12.9 | 12.2 |
| Comparative Example B2 | 0.054 | 104.8 | 68.0 | 32.1 | 15.4 | 19.8 | 71.1 |
| Comparative Example B3 | 0.234 | 45.9 | 28.7 | 39.2 | 8.7 | 7.2 | 18.1 |
| Comparative Example B4 | 0.033 | 102.3 | 72.0 | 13 | 34.0 | 2.5 | 36.8 |

| | The ratio of planar particles | Denseness/ Graininess | Luminance L5 | Brightness L55 | Easy dispersibility (minute) | Glossiness |
|---|---|---|---|---|---|---|
| Example B1 | 65 | 1.9 | 482 | 17 | 3 | 157 |
| Example B2 | 74 | 1.9 | 561 | 14 | 3 | 171 |
| Example B3 | 70 | 1.8 | 537 | 13 | 3 | 160 |
| Example B4 | 76 | 2.5 | 492 | 12 | 2 | 152 |
| Example B5 | 69 | 2.2 | 448 | 15 | 2 | 161 |
| Comparative Example B1 | 62 | 3.9 | 392 | 8 | 2 | 136 |
| Comparative Example B2 | 57 | 2.3 | 370 | 9 | 3 | 130 |
| Comparative Example B3 | 73 | 4.3 | 451 | 8 | 2 | 152 |
| Comparative Example B4 | 55 | 1.9 | 554 | 7 | 9 | 150 |

From the results shown in Table B1, it is shown that the aluminum pigment of the present invention is dense, has extremely high luminance, brightness and glossiness, and has good dispersion/workability.

INDUSTRIAL APPLICABILITY

The aluminum pigment of the present invention has industrial applicability to high-end metallic coating materials for automobile bodies and automobile interior parts; metallic coating materials for automobile repair; metallic coating materials for home appliances; metallic coating materials for optical equipment such as mobile phones, smartphones, PC's, tablets, cameras, and television sets; PCM; metallic coating materials for industrial use; high-end metallic printing inks for gravure printing, offset printing, or screen printing; and materials for kneading high-grade metallic resins.

The invention claimed is:

1. An aluminum pigment comprising metallic aluminum particles having an average thickness of 0.02 to 0.20 μm, an average aspect ratio (Cross-sectional length of particle/Cross-sectional thickness of particle) of 40 to 100, and a standard deviation of aspect ratio of 15 to 70, wherein a number ratio of the particles having an aspect ratio of 110 or more is 30% or less to the total.

2. The aluminum pigment according to claim 1, wherein the number ratio of the particles having an aspect ratio of 20 or less is 30% or less to the total.

3. The aluminum pigment according to claim 1, wherein the particles have an arithmetic mean height of surface roughness Sa of 2 to 15 nm.

4. The aluminum pigment according to claim 1, wherein the particles have an average thickness of 0.03 to 0.15 μm.

5. The aluminum pigment according to claim 1, wherein the particles have an average aspect ratio of 40 to 90.

6. The aluminum pigment according to claim 1, wherein the number ratio of the metallic aluminum particles having a particle size of 0.2 to 2.0 μm is 15 to 70% to the total of the metallic aluminum particles.

7. The aluminum pigment according to claim 1, wherein the particles comprise planar particles having a flatness (Shortest length/Cross-sectional length of particle) of 0.95 to 1.00, with a number ratio of 60% or more.

8. A coating material composition comprising the aluminum pigment according to claim 1.

9. An ink composition comprising the aluminum pigment according to claim 1.

10. A method for producing an aluminum pigment comprising grinding a raw material metallic aluminum powder with a grinding device, and classifying a slurry of the ground metallic aluminum powder to obtain the aluminum pigment, wherein the aluminum pigment comprises metallic aluminum particles having an average thickness of 0.02 to 0.20 μm, an average aspect ratio (Cross-sectional length of particle/Cross-sectional thickness of particle) of 40 to 100, and a standard deviation of aspect ratio of 15 to 70, and a number ratio of the particles having an aspect ratio of 110 or more is 30% or less to the total.

11. The method for producing the aluminum pigment according to claim 10, wherein the grinding is performed in two stages.

* * * * *